(12) United States Patent
Li (10) Patent No.: US 9,653,110 B2
(45) Date of Patent: May 16, 2017

(54) SPEED CONTROL OF DATA STORAGE DEVICE USING SERVICE CONTROLLER

(71) Applicant: Quanta Computer Inc., Taoyuan (TW)

(72) Inventor: Yung-Fu Li, Taoyuan (TW)

(73) Assignee: QUANTA COMPUTER, INC., Taoyuan (TW)

( * ) Notice: Subject to any disclaimer, the term of this patent is extended or adjusted under 35 U.S.C. 154(b) by 0 days.

(21) Appl. No.: 14/739,157

(22) Filed: Jun. 15, 2015

(65) Prior Publication Data

US 2016/0365109 A1    Dec. 15, 2016

(51) Int. Cl.
  *G11B 19/20* (2006.01)
  *G11B 19/28* (2006.01)
  *G11B 19/26* (2006.01)

(52) U.S. Cl.
  CPC ........ *G11B 19/209* (2013.01); *G11B 19/2054* (2013.01); *G11B 19/26* (2013.01); *G11B 19/28* (2013.01)

(58) Field of Classification Search
  CPC . G11B 19/20–19/2009; G11B 19/2054; G11B 19/209; G11B 19/26; G11B 19/28
  USPC .......... 360/55, 69, 71, 73.02–73.03
  See application file for complete search history.

(56) References Cited

U.S. PATENT DOCUMENTS

| | | | | |
|---|---|---|---|---|
| 5,469,553 A * | 11/1995 | Patrick | ............ | G05B 19/042 360/73.03 |
| 7,079,341 B2 * | 7/2006 | Kistler | ............ | G11B 19/28 360/46 |
| 7,571,279 B2 * | 8/2009 | Sade | ............ | G11B 19/20 360/73.03 |
| 7,715,145 B2 * | 5/2010 | Ooi | ............ | G11B 5/54 360/73.03 |
| 7,747,800 B2 * | 6/2010 | Zimoto | ............ | G06F 3/0625 710/5 |
| 7,953,909 B2 * | 5/2011 | Zimoto | ............ | G06F 3/0625 710/5 |
| 8,049,985 B2 * | 11/2011 | Zhu | ............ | G11B 19/042 360/73.03 |
| 8,086,881 B2 * | 12/2011 | Maruyama | ............ | G06F 1/3221 711/E12.103 |
| 8,111,476 B2 * | 2/2012 | Arizono | ............ | G06F 1/3203 360/73.03 |
| 8,185,667 B2 * | 5/2012 | Zimoto | ............ | G06F 3/0625 710/5 |
| 8,219,748 B2 * | 7/2012 | Uehara | ............ | G06F 1/3221 711/114 |
| 8,352,766 B2 * | 1/2013 | Maruyama | ............ | G06F 1/3221 711/161 |
| 8,369,040 B2 * | 2/2013 | Takamura | ............ | G11B 19/209 360/73.02 |

(Continued)

*Primary Examiner* — Wayne Young
*Assistant Examiner* — James L Habermehl
(74) *Attorney, Agent, or Firm* — Nixon Peabody LLP (57) ABSTRACT

Embodiments generally relate to data storage in a computing system. The present technology discloses techniques that that can enable an optimized mechanism to change spinning speed of data storage disk drives. The present technology can use a service controller, e.g. a Baseboard Management Device (BMC), to communicate with a disk controller to change the spinning speed of disk drives. The present technology can improve energy efficiency by efficiently controlling the spinning speed of disk drives. It can also reduce data access latency by promptly spinning up a disk from a spun-down state.

17 Claims, 6 Drawing Sheets

(56) References Cited

U.S. PATENT DOCUMENTS

| | | | |
|---|---|---|---|
| 8,806,125 B2* | 8/2014 | Zimoto | G06F 3/0625 |
| | | | 711/114 |
| 2009/0231751 A1* | 9/2009 | Asakura | G11B 5/596 |
| | | | 360/73.01 |

* cited by examiner

SPEED CONTROL OF DATA STORAGE DEVICE USING SERVICE CONTROLLER

FIELD OF THE INVENTION

The disclosure relates generally to data storage in a computing system.

BACKGROUND

As information technology continues to progress, there is a growing need for mass data storage. For example, data centers with mass data storage capacity are used for cloud storage. To meet these ever growing demands, data storage devices such as hard disk drives (HDDs) continue to grow more powerful and consume more energy.

However, powerful data storage devices can cause high energy consumption as well as overheating issues in a computing system. One common practice to solve these problems is to reduce the HDD spinning speed when the disks are not busy. Another reason to spin-down the HDDs is to prolong the longevity of HDDs by reducing thermal stress caused by excessive heat.

SUMMARY

Aspects of the present technology disclose techniques that can enable an optimized mechanism to change spinning speed of data storage disk drives. The present technology can, in some embodiments, use a service controller, e.g. a Baseboard Management Device (BMC), to communicate with a disk controller to change the spinning speed of disk drives. The present technology can improve energy efficiency by changing a spinning speed of the disk drives. For example, it can also reduce data access latency by promptly spinning up a disk from a spun-down state.

According to some embodiments, when a server restarts, a BMC can receive a reboot signal and accordingly generate a spin-up command for the disk drives, e.g. HDDs. According to some embodiments, the reboot signal can be generated by a power supply unit (PSU), power button, or reset button. According to some embodiments, an administrator can issue the reboot signal to a BMC through a dedicated network interface, e.g., a dedicated network interface card (NIC) of the BMC. By transmitting the spin-up signal by the BMC, instead of the main CPU that takes a substantial amount of time to reboot, the system can improve its performance by reducing data access latency.

According to some embodiments, in response to receiving a signal, a BMC can also issue a spin-down command for the disk drives, e.g. HDDs. According to some embodiments, the received signal can indicate a change of an operation status of the server.

According to some embodiments, instead of changing a spinning speed of all related HDDs, a BMC can select some disk drives to adjust their spinning speed. For example, based on the speed data of multiple disk drive subsystems, the BMC can select some disk drive subsystems to spin-up or spin-down.

According to some embodiments, a BMC can generate a speed command and transmit the speed command to disk drive controllers using a selected system bus, for example, via a Serial attached SCSI (SAS) or I²C. According to some embodiments, a BMC can transmit the speed command to a SAS controller, which can further transmit the speed command to a disk controller. Furthermore, a SAS expander can facilitate communication between large numbers of SAS devices and the server.

The disk drive spinning speed commands mentioned above can be disk drive power management or power condition commands, such as Active, Idle, Standby, and Sleep. For example, Sleep command will cause drive motor spin down and Active command will make drive spin up.

Although many of the examples herein are described with reference to adjusting spinning speed of HDDs, it should be understood that these are only examples and the present technology is not limited in this regard. Rather, any data storage devices may be used, such as solid-state drives (SSD).

Additionally, even though the present discussion uses a BMC in an example approach of how to generate the spinning command, aspects of the present technology are applicable to other service controllers, such as those that are independent from the main Central Processing Unit (CPU) of the computing device.

Additional features and advantages of the disclosure will be set forth in the description which follows, and, in part, will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

Various embodiments or examples ("examples") of the invention are disclosed in the following detailed description and the accompanying drawings.

DETAILED DESCRIPTION

Various embodiments of the present technology are discussed in detail below. While specific implementations are discussed, it should be understood that this is done for illustration purposes only. A person skilled in the relevant art will recognize that other components and configurations may be used without departing from the spirit and scope of the present technology.

To cope with the growing data storage need in the cloud computing era, mass data storage devices such as HDDs are widely used in modern data centers. For example, servers are equipped with large numbers of HDDs through various mechanisms. One mechanism is through Redundant Array of Independent Disk (RAID) technology that combines multiple HDDs into a logical unit for data redundancy or performance improvement. Another mechanism is through Non-RAID architectures such as Just a Bunch of Disks (JBOD). Hard drives in a JBOD may be accessed independently as separate logical volumes, or they may be combined into a single logical volume, thus rendering a flexible and efficient data storage solution.

For example, in a coverless 4U chassis, a JBOD can include 60 hot-pluggable HDDs varying from 2.5-inch to 3.5-inch. Such a JBOD can provide large data storage capacity, e.g. 240 TB.

The increased density of HDDs in computing systems consume tremendous amount of energy at a regular speed, e.g. 5,400 rpm. It can result in over-heat issues for both the HDDs and the server system. To save energy and reduce over-heating, one common practice is to spin-down the HDDs when they are not busy. For example, when client activities are insignificant, such as late at night, or when the server is powered off.

However, once a HDD has been spun-down, it takes a relatively long time to spin-up the disks to an operation speed. For example, it can take 10 to 15 seconds to spin up a HDD to its operation speed. Additionally, during a server reboot/reset, or power on, a CPU of a server can only issue a command to spin-up the HDDs after the CPU is ready, for example, after the CPU finishes the BIOS Power On Self-Test (BIOS POST), which can take several minutes. Such delays cause data access latency and impair system performance.

Thus, there is a need to improve the speed control method of disk drives for energy efficiency and system performance.

According to some embodiments, the present technology can improve the efficiency of a computing device by using a service controller to provide a control command to a disk drive for changing its spinning speed. The present technology can provide a solution specific to the technological problems created by inefficient speed controls for a large number of data storage devices, such as a JBOD system.

According to some embodiments, the present technology can utilize a service controller such as a BMC. A BMC is an independent and embedded microcontroller that, in some embodiments, is responsible for the management and monitoring of the main CPU, firmware and operating system. A BMC can monitor the server's hardware components by receiving data from sensors installed in the chassis, e.g., fan speeds, CPU temperature, power consumption level, etc. According to some embodiments, a BMC can receive a power signal from a power supply unit (PSU) or from a button pressed, which indicates a power on or reboot/reset of a server. Then the BMC can generate a spin-up command to HDDs via SAS controller or SAS Expander or some other intermediate component associated with the server in expectation of a server reboot. Thus, it saves the waiting period for the main CPU to finish the BIOS POST procedure and become ready to issue the spin-up command.

According to some embodiments, a BMC can receive a reboot signal from a main CPU of a computing device, and accordingly generate a spin-up signal for the HDDs. A BMC can also receive a command signal from an administration device through a dedicated network interface, e.g., a dedicated network interface card (NIC) of the BMC. In this example, depending on the operation status of the server, a server administrator can issue a spin-up command to the BMC, which further generates commands to spin up the disk drive's rotation.

According to some embodiments, a BMC can receive a signal indicating a change of an operation status of the server. Frequently, changes in server's operation status require disk drives to change their spinning speed accordingly. Examples of such changes include a power-on process, a power-off process, a reset process, a process that initiates the idling of a server, or a process that wakes up the server from idling.

According to some embodiments, when a server is in communication with a group of disk drive subsystems, e.g. in a JBOD, a BMC can select a sub-group of disk drives to adjust their spinning speed. For example, the BMC can select some disk drive subsystems to spin-up or spin-down based on the speed data of the group of disk drive subsystems. Examples of speed data include historical data of the disk drive speed, thermal data of the disk drives, disk drive usage data of a client, or any data that can be utilized for this purpose.

According to some embodiments, a BMC can generate the speed command and transmit the speed command to disk drive controllers via its selected system bus. Examples of such controllers include Serial Attached SCSI (SAS) controllers and Serial ATA (SATA). Furthermore, to enable a server to communicate with multiple disk drives, a SAS expander can facilitate communication between large numbers of SAS devices with the server.

Figure 1:
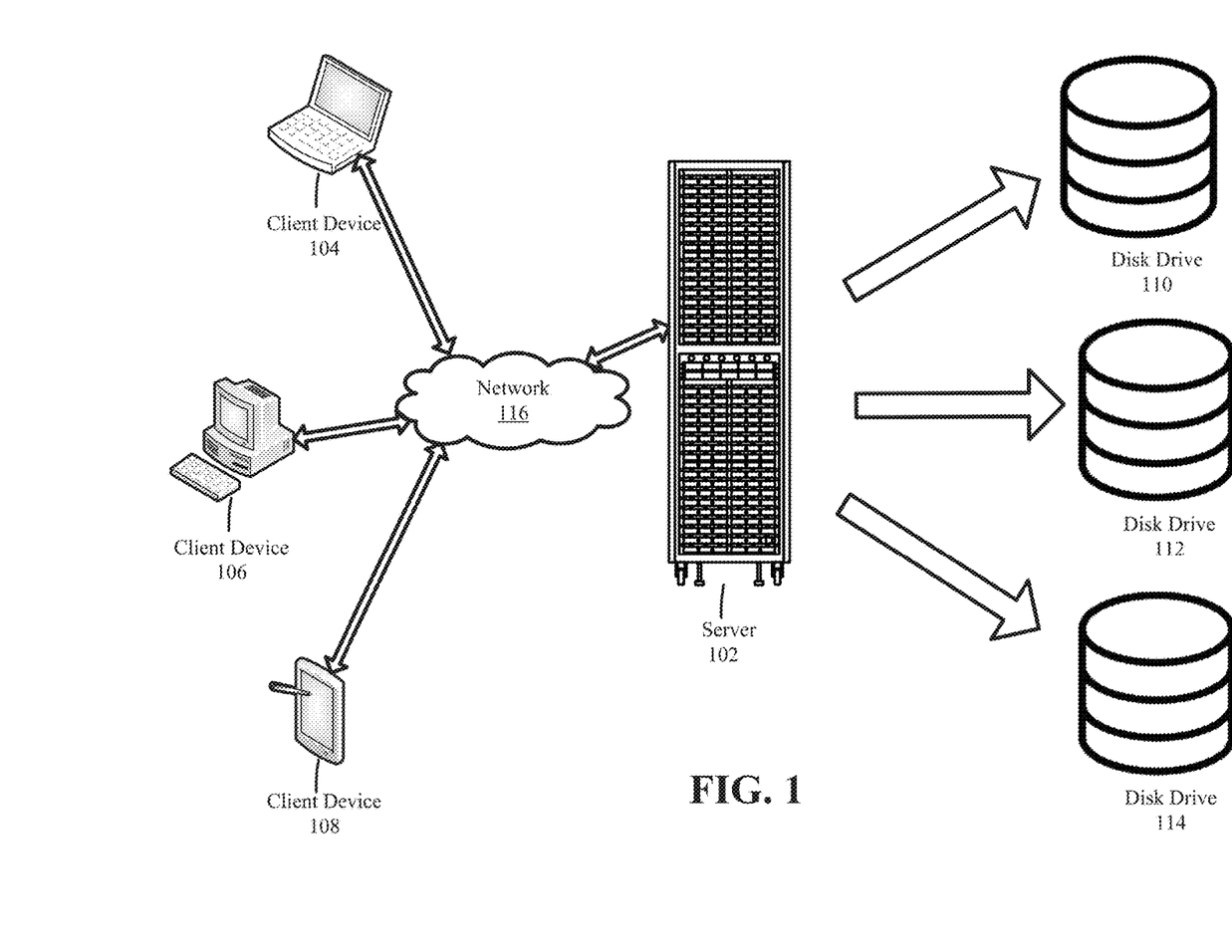
FIG. 1 illustrates an overall system diagram, including a server that is in communication with multiple client terminals, according to some embodiments.

FIG. 1 illustrates a system diagram including a server system that is in communication with multiple client terminals, according to some embodiments. A multi-client server network includes, for example, a Server 102 and multiple client devices such as Client Device 104, 106 and 108. Examples of a client device include a desktop, a laptop, a portable computing device, a mobile phone, etc. Using the client devices, different client applications, e.g. Email, texting, etc. can read and write data stored in Server 102. Furthermore, Server 102 can manage data transactions between server 102 and multiple client devices 104, 106 and 108 through Network 116, such as a LAN (Local Area Network). Server 102 can comprise multiple disk drives such as 110, 112 and 114. Examples of the disk drives can be HDDs or other data storage devices such as Solid State Devices (SSD).

Each client device, for example, can be assigned full data storage capacity associated with one or more disk drives. Alternatively, a client device can be assigned a selected segment of data storage capacity of one or more disk drives. Such disk drive ownership and division information can be used to determine a disk drive's spinning speed corresponding to the client's data access activity. For example, Client Device 104 is the sole user of Disk Drive 110. Accordingly, the spinning speed of Disk Drive 110 can be adjusted according to the frequencies of the data access activities, e.g. read and write into the storage media, by Client Device 104.

In accordance with the teachings of the present technology, Server 102 can comprise a service controller, e.g. a BMC (not shown). A BMC is an independent and embedded microcontroller that, in some embodiments, is responsible for the management and monitoring of the main CPU, firmware and operating system. A BMC can monitor the server's hardware components by receiving data from sensors installed in the chassis, e.g., fan speeds, CPU temperature, power consumption level, etc. By utilizing the BMC, Server 102 can provide an optimized speed control of the disk drives. Such an approach can save power consumption without impairing system performance.

Still referring to FIG. 1, a BMC can enable remote server management (e.g., out-of-band management), which can provide a centralized and flexible administration solution. For example, using out-of-band management, an administrator can monitor the operation status of a large number of servers and disk drives via LAN. The administrator can adjust BIOS (Basic Input/Output System) settings or monitor a server's physical status such as temperature, voltage, and fan speed, etc. The administrator can adjust the disk drive speed according to a server's physical status as well.

Additionally, the present technology can utilize other service controllers, e.g. a Rack Management Controller (RMC), to transmit the speed command for the disk drives.

Figure 2:
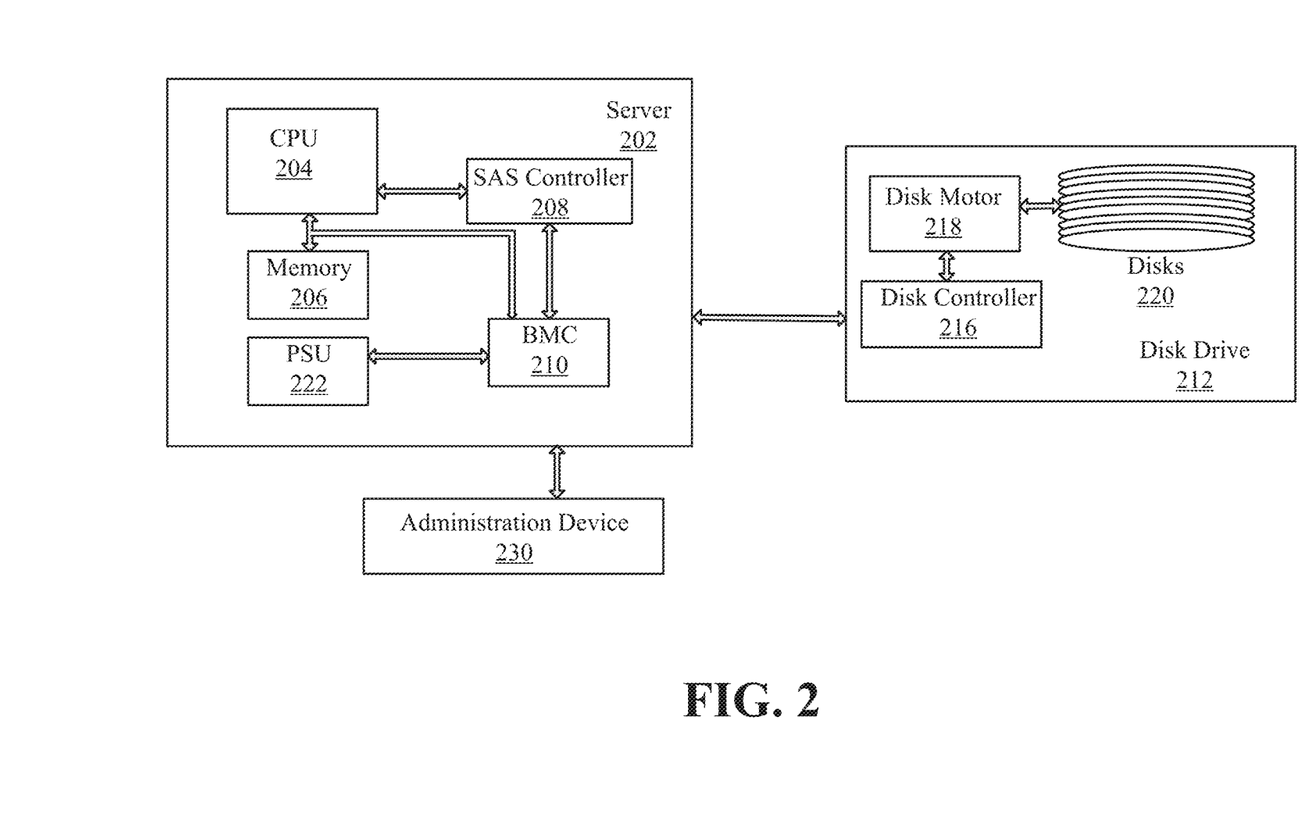
FIG. 2 is a schematic block diagram illustrating an example of a disk drive speed management system, according to some embodiments.

FIG. 2 is a schematic block diagram illustrating an example of a disk drive speed management system, according to some embodiments. Server 202 can comprise a CPU 204, memory (e.g., RAM) 206 in communication with the CPU, a PSU 222 for Server 202, and a SAS controller 208 in communication with other components via a system bus, e.g. a SCSI bus. Server 202 can further comprise a BMC 210, which has its independent power supply and operation system, e.g. Intelligent Platform Management Interface (IPMI). Further, Server 202 can include an Input/Output (I/O) unit, e.g. a network interface card (NIC), for connecting Server 202 with other devices, e.g. Administration Device 230, or client computing devices. Additionally, it should be noted that Server 202 can include multiple CPUs or nodes as well as other components.

As illustrated in FIG. 2, Server 202 can be internally or externally connected with one or more Disk Drives. Disk Drive 212 can comprise Disk Controller 216, Disk Motor 218 and Disks 220. According to some embodiments, Disks 220 can be data storage devices comprising rapidly rotating magnetic disks (platters) for storing and retrieving digital data. As Disks 220 spin, magnetic disks rotate under a read/write head (not shown), which can allow the read/write head to successively read data stored within the magnetic disks or write data into them. Disks 220 can communicate with Server 202 via a standard interface such as SATA (Serial ATA) or SAS (Serial attached SCSI).

Disk Controller 216 and Disk Motor 218 are embedded in Disk Drive 212. Disk Controller 216 is an integrated circuit for controlling the operation of a disk drive. Disk Motor 218 can be, for example, a servo motor or spindle motor, for rotating Disks 220 and positioning a read/write head. Disk Motor 218 can spin Disks 220 at a designated speed based on commands received by Disk Controller 216.

When Server 202 is powered off, Disks 220 are spundown and parked so that Disks 220 do not physically rotate and the disk read/write head is fixed at a safe distance from the platters. Conventionally, when Server 202 is powered up, CPU 204 has to wait for several minutes to be ready to issue commands to SAS Controller 208 to spin-up Disks 220. For example, the BIOS Power On Self-Test (BIOS POST) procedure can consume substantial amount of time for CPU 204 to be ready to issue the pin-up command.

Further, spinning-up Disks 220 can take additional various amount of time. For example, a typical spin-up time for an operation disk speed is about 10-15 seconds. All in all, the delays in waiting for the CPU to be ready and spinning-up disk drives can cause significant delay in accessing the stored data.

According to the present technology, BMC 210 can, for example, issue commands to SAS Controller 208 for spinning-up Disks 220. According to some embodiments, when Server 202 is powered on, BMC 210 can receive a power signal from PSU 222 that indicates a power-on process of Server 202. Accordingly, BMC 210 can promptly generate a spinning command to SAS Controller 208 to spin up Disks 220 to an operation speed. By delegating the spinning command to BMC 210, the system does not need to wait for the rebooting CPU 204 to be ready and thus saves time in spinning-up Disks 220.

According to some embodiments, BMC 210 can issue a spinning command in parallel with CPU 204. For example, BMC 210 can issue a spinning-up command for Disks 220 when CPU 204 is rebooting; after CPU 204 is ready, CPU 204 can issue another spinning-up command for Disks 220.

After receiving the spinning command, SAS Controller 208 can transmit the command to Disk Controller 216 that can accordingly control Disk Motor 218 to spin up Disks 220. For example, Disk Controller 216 can determine an operational speed for Disks 220 based on the spinning-up command, and generate a motor control output signal to Disk Motor 218 for spinning up Disks 220.

According to some embodiments, BMC 210 can directly receive a spinning command from an administrator from Administrator Device 220. For example, when main CPU 204 loses power but Disk Drive 212 has power, an administrator can issue a spinning-up command to BMC 210 for spinning up Disks 220 for data accessing. This feature can provide a mechanism to reach stored data in Disk Drive 212 when Server 202 is largely unavailable.

Additionally, BMC 210 can issue commands to spindown Disks 220 through detecting a signal generated by various sources. For example, BMC 210 can detect a signal indicating gradual power-loss at PSU 222 and then promptly notify SAS Controller 208 to spin-down Disks 220. This approach can avoid physical damages to Disks 220 by the read/write head at a sudden loss of power. According to some embodiments, after detecting an overheating condition at Disk Drive 212, Administration Device 230 can send a signal to BMC 210 for reducing the rotation speed of Disks 220.

According to some embodiments, BMC 210 can automatically generate speed-changing commands for Disks 220 based on various speed data related to Disks 220. According to some embodiments, because BMC 210 can receive thermal data, e.g. an internal temperature, for example provided by sensors within a server chassis, BMC 210 can determine a proper spinning speed for Disks 220 in light of the thermal data. For example, an overheated chassis temperature can indicate a need for lowering the spinning speed of Disks 220.

According to some other embodiments, BMC 210 can use client usage data of Disks 220 to determine an ideal spinning speed for Disks 220 at different times of the day. For example, client A's storage activity pattern suggests that client A has frequent data storage access between 9:00 a.m. to 5:00 p.m. for each working day. On the other hand, client A's data storage activity is relatively insignificant from 9:00 p.m. to 4:00 a.m. each night. According to such client usage data, BMC 210 can accordingly maintain a high spinning speed of Disks 220, e.g. 5400 rpm, at the high-demand hours and reduce the spinning speed to a lower level, e.g. 1000 rpm, at the low-demand hours.

According to some embodiment, a SAS Expander (not shown) can be in communication with SAS Controller 208 for allowing Server 202 to communicate with additional Disk Drives 212. According to some embodiments, BMC 210 can transmit speed-varying commands to SAS Expander, instead of SAS Controller 208.

Figure 3:
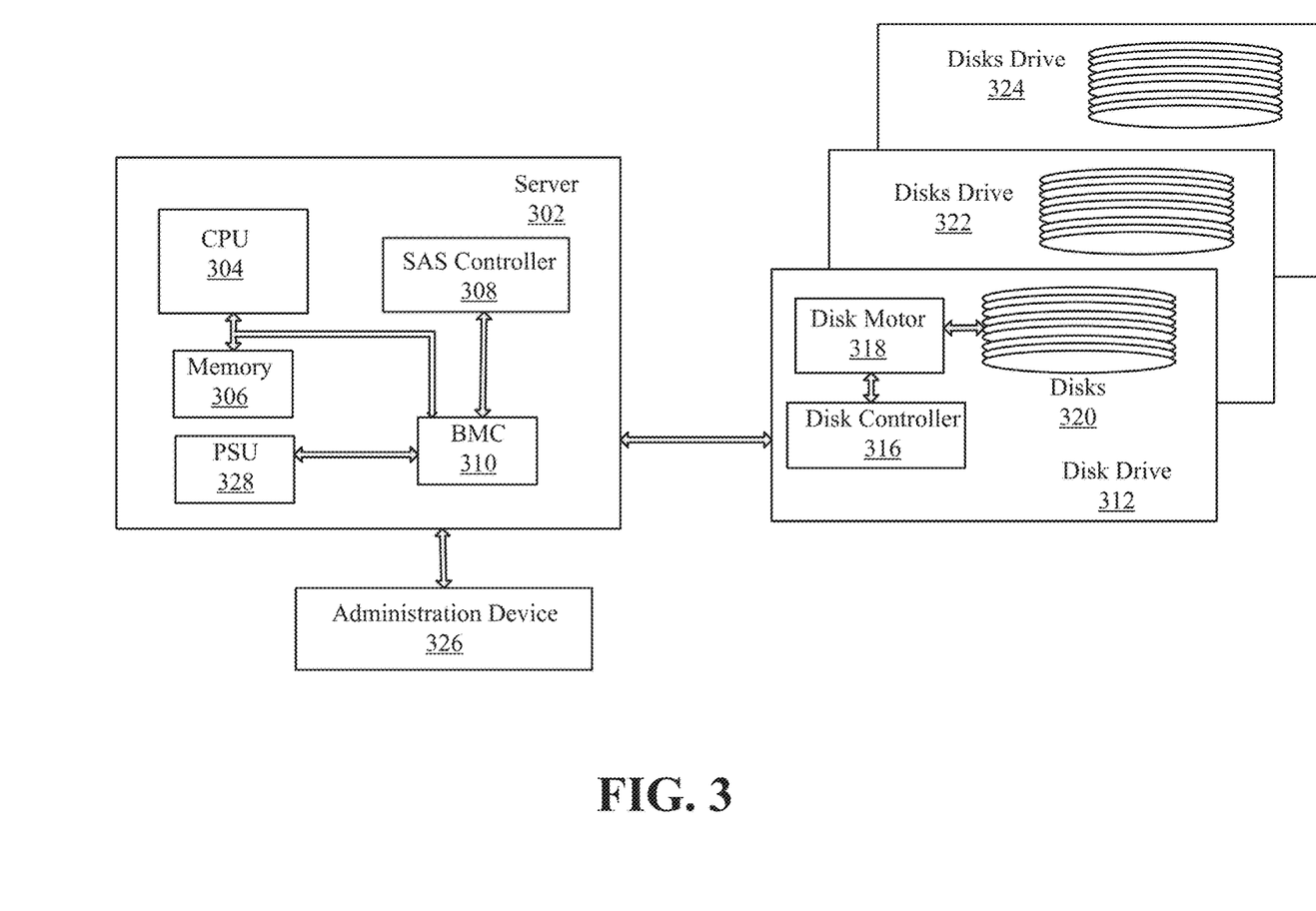
FIG. 3 is another schematic block diagram illustrating an example of a disk drive speed management system with multiple disk drive subsystems, according to some embodiments.

FIG. 3 is another schematic block diagram illustrating an example of a disk drive speed management system with multiple disk drive subsystems, according to some embodiments. Server 302 can comprise a CPU 304, a Memory 306

(e.g. RAM) in communication with the CPU, a PSU 328, a SAS controller 308 in communication with other components via a system bus, e.g. a SCSI bus. Server 302 can further comprise a BMC 310, which has its independent power supply and operation system, e.g. IPMI. Further, Server 302 can include an Input/Output (I/O) unit, e.g. a network interface card (NIC), for connecting Server 302 with other devices, e.g. Administration Device 326, or client computing devices (not shown). Additionally, it should be noted that Server 302 can include multiple CPUs or nodes as well as other components.

As illustrated in FIG. 3, Server 302 can be connected with multiple Disk Drives such as Disk Drives 312, 322 and 324. Server 302 can connect with Disk Drives 312, 322 and 324 through different architectures. For example, in a JBOD architecture, Disk Drives 312, 322 and 324 can be accessed independently as separate logical volumes, or they may be combined into a single logical volume.

Each disk drive, e.g., Disk Drive 312, can comprise Disk Controller 316, Disk Motor 318 and Disks 320. According to some embodiments, Disks 320 can be data storage device using rapidly rotating magnetic disks (platters) for storing and retrieving digital data. Disk Drives 312, 322 and 324 can communicate with Server 302 via a standard interface such as SAS.

Disk Controller 316 and Disk Motor 318 are embedded in Disk Drive 312. Disks Controller 316 is an integrated circuit for controlling the operation of a disk drive. Disk Motor 318 can be, for example, a servo motor or spindle motor, for rotating a disk drive and positioning a read/write head. Disk Motor 318 can spin Disks 320 at a speed based on commands received by Disk Controller 316.

When Server 302 is shut down, Disks 320 and the like are spun-down or parked so that they do not physically rotate. According to the present technology, when Server 302 is rebooting, BMC 310 can, for example, replace CPU 304 to issue spinning commands to SAS Controller 308 for spin-up Disks 320 and the like. According to some embodiments, BMC 310 can receive a power signal from PSU 322 that indicates a power-on process of Server 302. Accordingly, BMC can promptly generate a spinning command to SAS Controller 308 to spin-up Disks 320 and the like.

After receiving the spinning command, SAS Controller 308 can transmit the command to Disk Controller 316, which can accordingly control Disk Motor 318 to spin up Disks 320.

According to some embodiments, BMC 310 can also directly receive a spinning command from Administrator Device 326. Because BMC 310 has an independent power supply and operation system, it can remain functional after CPU 304 is nonresponsive for some reason.

According to some embodiments, BMC 310 can spin-down Disks 320 and the like. For example, BMC 310 can detect a gradual power-loss at PSU 328 and then promptly notify SAS Controller 308 to spin-down all Disks in Disk Drives 312, 322 and 324. This approach can avoid physical damages to Disks by the read/write head at a loss of power.

According to some embodiments, after detecting overheat at Disk Drive 320, an administrator can issue a spin-down command to BMC 310 to reduce rotation speed of Disks 320 and the like.

According to some embodiments, BMC 310 can automatically generate speed commands for Disks 320 and the like based on various data related to these disks. For example, because BMC 310 can receive thermal data, e.g. an internal temperature, provided by sensors within a server chassis, BMC 310 can determine a proper spinning speed for Disks 320 and the like based on the thermal data. For example, BMC 310 can utilize previous client usage pattern to determine an ideal spinning speed for the disk drives. For example, client A has frequent data access, e.g. read/write, between 9:00 a.m. to 5:00 p.m. at each working day, and is significantly inactive from 9:00 p.m. to 4:00 a.m. According to such usage pattern, BMC 310 can accordingly maintain a high spinning speed of Disks 320 and the like, e.g. 5400 rpm during the high-demand hours and reduce the spinning speed to a lower level, e.g. 1000 rpm, at the low-demand hours.

Additionally, according to some embodiments, BMC 310 can select a sub-group of disk drives from a group of disk drives to change their spinning speed. For example, Client A is the sole user of Disk Drive 312. Further, client A has frequent data access at Disk Drive 312 between 9:00 a.m. to 5:00 p.m., and is inactive from 9:00 p.m. to 4:00 a.m. On the other hand, Client B is the sole user of Disk Drive 322, and Client B has frequent data access all the time. Based on these speed data, BMC 310 can spin-down Disk Drive 312 from 9:00 p.m. to 4:00 a.m., but retain a consistent spinning speed for Disk Drive 322.

According to some embodiments, an administrator, for example via Administration Device 326, can issue commands to BMC 310 to select some disk drives from a group of disk drives to change their spinning speed.

According to some embodiment, a SAS Expander (not shown) can be in communication with SAS Controller 308 or BMC 310 for enabling Server 302 to communicate with more disk drives.

Figure 4:
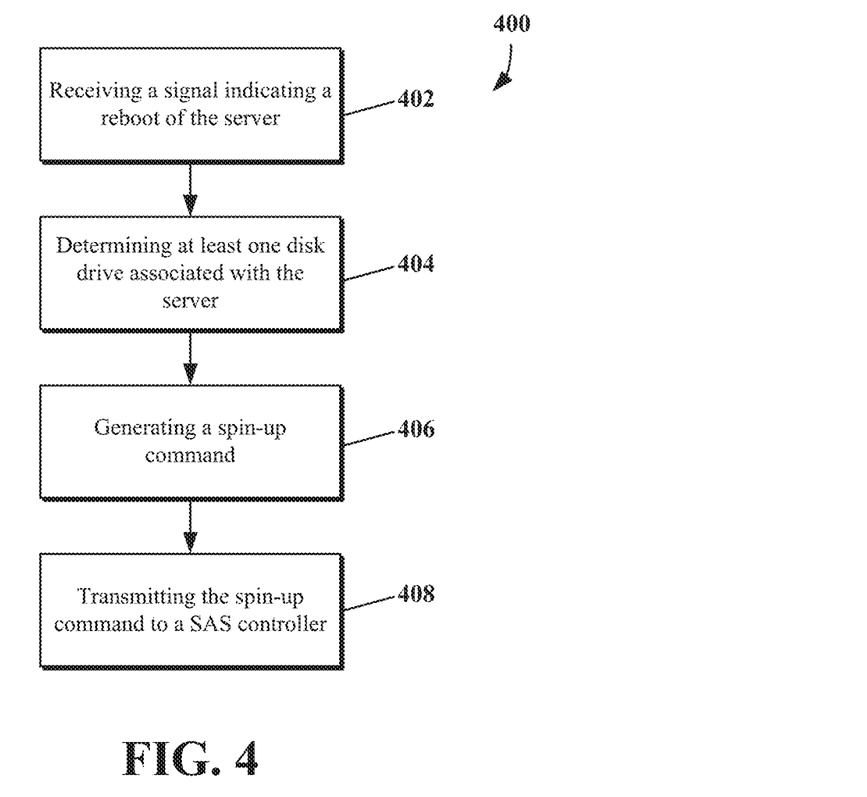
FIG. 4 is an example flow diagram for a disk drive speed management system, according to some embodiments.

FIG. 4 is an example flow diagram for an approach to spinning-up a disk drive in a disk drive speed management system, according to some embodiments. It should be understood that there can be additional, fewer, or alternative steps performed in similar or alternative orders, or in parallel, within the scope of the various embodiments unless otherwise stated.

At step 402, a service controller, e.g. a BMC, can receive a signal indicating an initiating stage of a server. For example, when a server is powered on, the BMC can detect a power signal from a PSU of the server. For example, the BMC can detect other signals that indicate a rebooting of the server, e.g. a signal provided by an administration device in communication with the BMC and the server or a signal provided by pressing server reset button.

At step 404, the BMC can determine at least one disk drive associated with the server. For example, a software program running on server OS can detect the disk drives associated with server, then informs the BMC. In another example, the BMC asks the SAS controller or the SAS expander to know whether the disk drives associated with the server.

At step 406, the BMC can generate a spin-up command for the determined disk drive. For example, BMC can generate a spin-up command based on a disk drive parameter specified by an administrator of the server. According to some embodiments, the BMC can determine a proper speed of the determined disk drive based on various factors such as disk drive specifications and/or pervious disk speed data.

At step 408, the BMC can transmit the spin-up command to a SAS controller or a SAS Expander. For example, the SAS controller, after receiving the spin-up command, can transmit the command to a disk controller associated with the determined disk drive. The disk controller can then convert the command into digital signals to control the disk motor for spinning up the disk drive. According to some embodiments, the SAS controller is further connected to a SAS expander for enabling the server to communicate with more disk drives.

Figure 5:
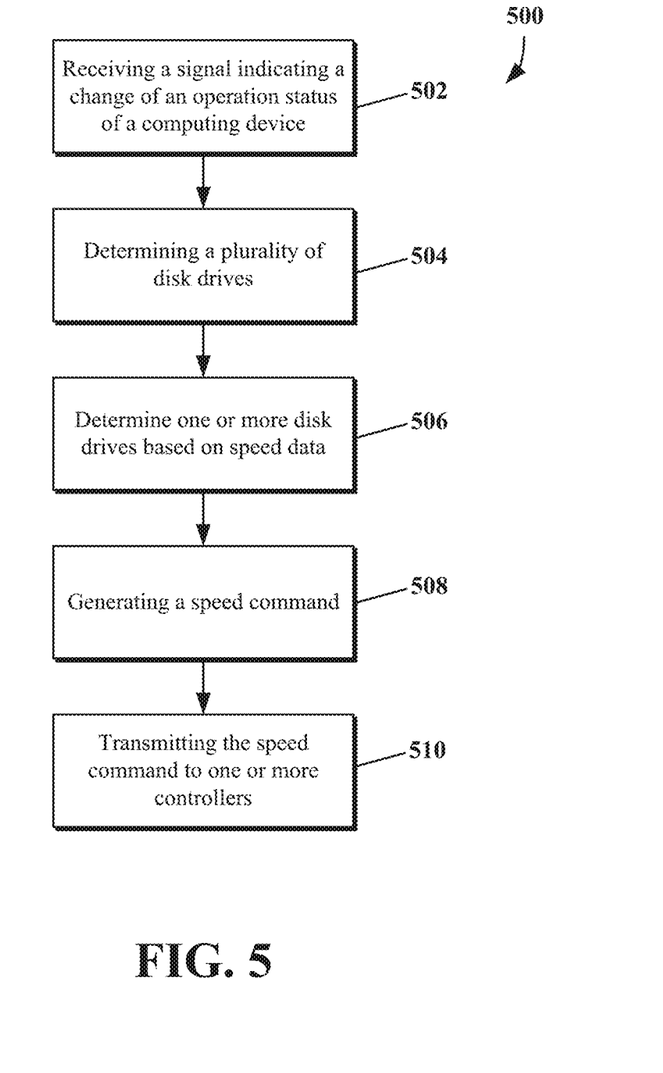
FIG. 5 is another example flow diagram for a disk drive speed management system with multiple disk drive subsystems, according to some embodiments.

FIG. 5 is another example flow diagram for varying spinning speed of a disk drive speed management system having multiple disk drive subsystems, according to some embodiments. It should be understood that there can be additional, fewer, or alternative steps performed in similar or alternative orders, or in parallel, within the scope of the various embodiments unless otherwise stated.

At step 502, a service controller, e.g. a BMC, can receive a signal indicating a change of an operation status of a computing device. A change of an operation status often can require a change in the spinning speed of a disk drive. Examples of a change in the operation status includes a power-on process of a computing device, a power-off process of a computing device, a reset process of a computing device, a process that initiates an idling status, or a process that wakes up the computing device from the idling status.

At step 504, the BMC can determine a group of disk drives that are associated with the computing device. For example, BMC can retrieve related disk drive data and use the data to determine disk drives that is in communication with the server.

At step 506, the BMC can determine and select one or more disk drives from the group of disk drives to change the spinning speed based on speed data. Speed data can comprise disk speed history data of the disk drives, thermal data of the disk drives, client disk drive data, or any other data that is accessible for BMC.

At step 508, the BMC can generate a speed command for the one or more determined disk drives to change the spinning speed. For example, BMC can generate a spin-up command or a spin-down command.

At step 510, the BMC can transmit a speed command to one or more controllers that associated with the determined disk drives, such as SAS controller, SAS expander, or disk controller embedded in disk drive. For example, disk controllers embedded in the determined disk drives, after receiving a speed command, can convert the command into digital signals to control the disk motors for varying the spin speed of the determined disk drives.

Figure 6:
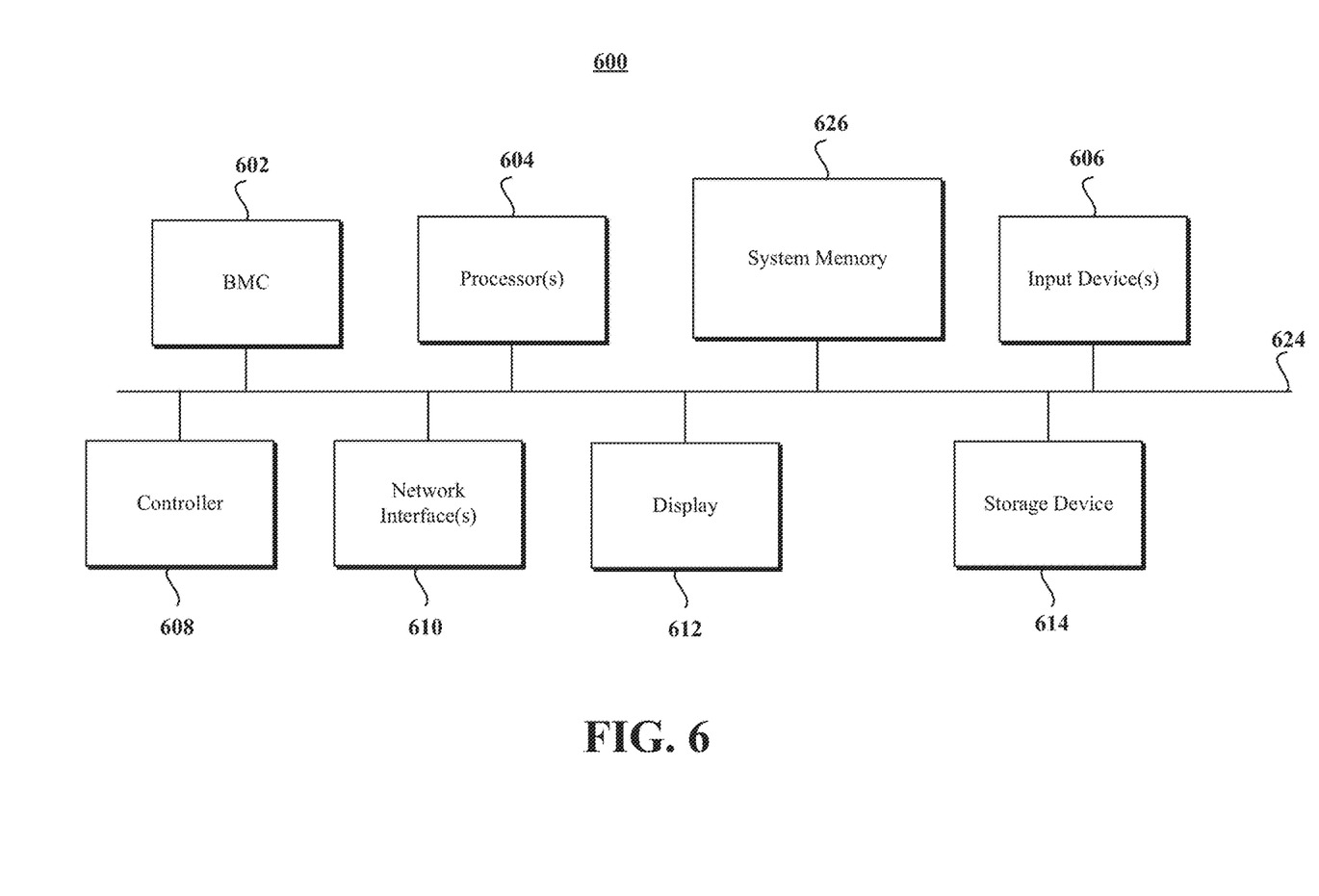
FIG. 6 illustrates a computing platform of a computing device, according to some embodiments.

FIG. 6 illustrates an example system architecture 600 for implementing the systems and processes of FIGS. 1-5. Computing platform 600 includes a bus 624 which interconnects subsystems and devices, such as: service controller 602, processor 604, storage device 614, system memory 626, a network interface(s) 610, and a disk drive controller 608. Processor 604 can be implemented with one or more central processing units ("CPUs"), such as those manufactured by Intel® Corporation—or one or more virtual processors—as well as any combination of CPUs and virtual processors. Computing platform 600 exchanges data representing inputs and outputs via input-and-output devices input devices 606 and display 612, including, but not limited to: keyboards, mice, audio inputs (e.g., speech-to-text devices), user interfaces, displays, monitors, cursors, touch-sensitive displays, LCD or LED displays, and other I/O-related devices. The disk controller 608 can be embedded in disk drive, or be an external controller from disk drive, such as SAS controller or SAS Expander.

According to some examples, computing architecture 600 performs specific operations by processor 604, executing one or more sequences of one or more instructions stored in system memory 626. Computing platform 600 can be implemented as a server device or client device in a client-server arrangement, peer-to-peer arrangement, or as any mobile computing device, including smart phones and the like. Such instructions or data may be read into system memory 626 from another computer readable medium, such as storage device 714. In some examples, hard-wired circuitry may be used in place of or in combination with software instructions for implementation. Instructions may be embedded in software or firmware. The term "computer readable medium" refers to any tangible medium that participates in providing instructions to processor 604 for execution. Such a medium may take many forms, including, but not limited to, non-volatile media and volatile media. Non-volatile media includes, for example, optical or magnetic disks and the like. Volatile media includes dynamic memory, such as system memory 626.

Common forms of computer readable media includes, for example: floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 624 for transmitting a computer data signal.

In the example shown, system memory 626 can include various modules that include executable instructions to implement functionalities described herein. In the example shown, system memory 626 includes a log manager, a log buffer, or a log repository—each can be configured to provide one or more functions described herein.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

What is claimed is:

1. A method, comprising:
receiving, at a service controller associated with a server, a signal indicating a power event associated with the server;
determining at least one disk drive associated with the server, the at least one disk drive having a first spinning speed;
generating a spin-up command for the at least one disk drive; and
transmitting the spin-up command to a SAS controller associated with the at least one disk drive, the SAS controller operable to enable the at least one disk drive to spin at a second spinning speed that is higher than the first spinning speed;
wherein the SAS controller is operable to transmit the spin-up command to at least one disk controller that is associated with the at least one disk drive, the at least one disk controller being operable to determine the second spinning speed for the at least one disk drive based at least upon the spin-up command.

2. The method of claim 1, wherein the spin-up command is operable to increase the at least one disk drive to the second spinning speed without transmitting a signal generated by a CPU of the server to the at least one disk drive.

3. The method of claim 1, wherein the spin-up command includes at least one or more of a power management or power condition command.

4. The method of claim 1, wherein the signal is associated with a power supply component of the server.

5. The method of claim 1, wherein the SAS controller is associated with at least one SAS expander operable to communicate with the at least one disk drive.

6. A system, comprising:
a processor; and
a memory device including instructions that, when executed by the processor, cause the system to:
receive, at a service controller associated with a computing device, a signal indicating a change of an operation status associated with the computing device;
determine a plurality of disk drives associated with the computing device; select one or more disk drives from the plurality of disk drives based at least in part on speed data associated with the plurality of disk drives;
generate a speed command operable to change a first spinning speed of selected one or more disk drives; and
transmit the speed command to one or more controllers associated with the selected one or more disk drives, the one or more controllers being operable to change the first spinning speed of the one or more disk drives to a second spinning speed;
wherein the at least one of the one or more controllers comprises one or more disk controllers associated with the selected one or more disk drives.

7. The system of claim 6, wherein the speed command is operable to change the selected one or more disk drives to the second spinning speed without a signal generated by a CPU of the computing device being transmitted to the selected one or more disk drives.

8. The system of claim 6, wherein the change of the operation status comprises one of a power-on process of the computing device, a power-off process of the computing device, a reset process of the computing device, a first process that initiates an idling status of the computing device, or a second process that wakes up the computing device from the idling status.

9. The system of claim 6, wherein the speed data comprises at least one of history data associated with the plurality of disk drives, power data associated with the plurality of disk drives, thermal data associated with the plurality of disk drives, or disk drive usage data associated with one or more client devices.

10. The system of claim 6, wherein at least one of the one or more controllers comprises a SAS controller or a SAS Expander associated with the computing device.

11. The system of claim 6, wherein the signal is associated with a server administration device.

12. The system of claim 6, wherein the signal is associated with a power supply, power button, or reset button component of the computing device.

13. A non-transitory computer-readable storage medium storing instructions, the instructions when executed by a processor causing the processor to:
receive, at a service controller associated with a computing device, a signal indicating a change in an operation status of the computing device;
determine a plurality of disk drives associated with the computing device; select one or more disk drives from the plurality of disk drives based at least in part on speed data associated with the plurality of disk drives;
generate a speed command for changing a first spinning speed of the one or more disk drives; and
transmit the speed command to at least one controller associated with the one or more disk drives, the at least one controller being operable to change the first spinning speed of the selected one or more disk drives to a second spinning speed;
wherein the speed data comprises disk drive usage data associated with at least one client device, and
wherein the one or more disk drives are associated with the at least one client device.

14. The non-transitory computer-readable storage medium of claim 13, wherein the speed data comprises at least one of history data associated with the plurality of disk drives, thermal data associated with the plurality of disk drives, power data associated with the plurality of disk drives, or disk drive usage data associated with one or more client devices.

15. The non-transitory computer-readable storage medium of claim 13, wherein the plurality of disk drives can be accessed independently as separate logical volumes.

16. The non-transitory computer-readable storage medium of claim 15, wherein the plurality of disk drives comprises hard disk drives.

17. The non-transitory computer-readable storage medium of claim 13, wherein the speed command is one of a spin-up, spin-down, active, idle, standby, or sleep command.

* * * * *